June 25, 1957     E. E. DUMAS     2,796,907
EXPANSION NUT COMPRISED OF FLANGED OUTER SLEEVE
AND TAPERED, THREADED EXPANDER THEREOF
Filed June 26, 1953
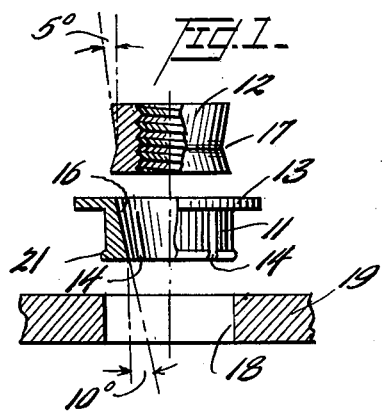
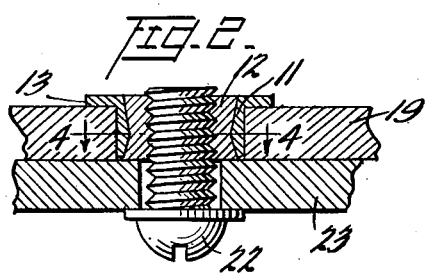
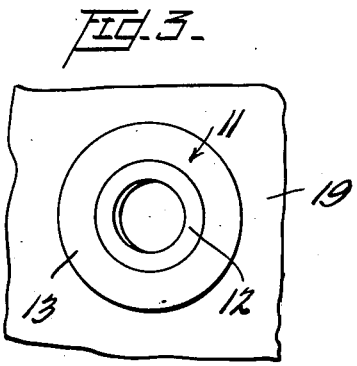
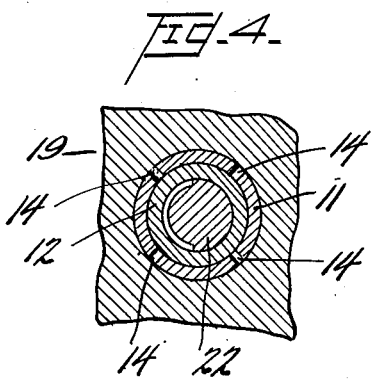
INVENTOR
*Edward E. Dumas,*
BY *A. C. Schwarz, Jr.*
ATTORNEY

United States Patent Office 2,796,907
Patented June 25, 1957

2,796,907

EXPANSION NUT COMPRISED OF FLANGED OUTER SLEEVE AND TAPERED, THREADED EXPANDER THEREOF

Edward E. Dumas, Haw River, N. C., assignor to Western Electric Company, Incorporated, New York, N. Y., a corporation of New York Application June 26, 1953, Serial No. 364,268

3 Claims. (Cl. 151—41.74)

This invention relates to an expansion nut and more particularly to a two part expansion nut designed to be fitted into an aperture in a mounting plate.

It is an object of this invention to provide a simple, efficient and convenient nut of the expansion type that can be permanently mounted in an aperture of a mounting plate so that an externally threaded member can be attached thereto.

A complete understanding of the invention may be obtained from the following detailed description taken in conjunction with the accompanying drawings, in which:

Fig. 1 shows an exploded partial vertical section of an expansion nut and a mounting plate;

Fig. 2 shows an axial vertical section of the expansion nut mounted on the mounting plate with an externally threaded member and an adjacent plate secured thereto;

Fig. 3 shows a plan view of the expansion nut mounted on the mounting plate; and Fig. 4 shows a horizontal section of the expansion nut and the mounting plate taken along line 4—4 of Fig. 2.

Referring now to the drawings, wherein like reference numerals designate similar parts throughout the several views, the expansion nut is illustrated in each figure and consists generally of two parts, an outer casing or sleeve 11 and an internally threaded tubular member 12. The outer casing 11 is made of soft, mild, cold rolled steel formed into a substantially cylindrical sleeve with a shoulder or flange 13 to limit the axial movement and a plurality of slots 14 to allow expansion. An internal wall 16 of the outer casing 11 has a taper of ten degrees with respect to the vertical axis as shown in Fig. 1.

The internally threaded tubular member 12 is made of case hardened machine steel having a hardness of approximately Rockwell C 50 and is formed of a circular horizontal cross section as shown in Figs. 3 and 4, and an external wall 17 with a re-entrant angle or a concave surface formed by a taper of five degrees with respect to the vertical axis as shown in Figs. 1 and 2.

The outer casing 11 fits in an aperture 18 of a mounting plate 19 and a small ridge 21 at the lower end of the outer casing 11 insures a snug fit in the aperture 18. The mounting plate 19 can be made of aluminium or any other suitable material. After the comparatively soft steel casing 11 is placed in the aperture 18, the case hardened internally threaded tubular member 12 is pressed or forced into the outer casing 11 as shown in Fig. 2. There is a taper difference of five degrees between the external wall 17 of the internally threaded member 12 and the internal wall 16 of the outer casing 11 so that when the hard metal member 12 is forced into the comparatively soft metal casing 11, the metal of the casing 11 will flow into the cavity formed by the concave external wall 17 of the case hardened member 12 and into the expanded slots 14 and thereby lock the internally threaded member 12 and the outer casing 11 in the aperture 18 of the mounting plate 19. It is impossible to press this internally threaded member 12 out of the casing 11 without tearing the metal of the mounting plate 19 once it has been placed fully therein. The member 12 and the casing 11 may be secured to the mounting plate 19 in one operation, as well as by separate operations as indicated above.

In Fig. 2, an externally threaded member 22 is shown in engagement with the expansion nut and an adjacent plate 23 for holding the mounting plate 19 and the adjacent plate 23 together. Fig. 2 illustrates one of the many uses of this expansion nut and it is easy to visualize many other possible uses therefor. Although the expansion nut is primarily used in plates having apertures that pass therethrough, it can be used in blind holes.

It is to be understood that while the embodiment disclosed and described herein is a preferred one, the invention is susceptible to many different forms, and that other instrumentalities may be substituted for those disclosed, and that various changes and modifications may be made without departing from the spirit and scope of the invention.

What is claimed is:

1. An expansion nut adapted to be secured in an aperture of a mounting plate comprising a substantially cylindrical member having a threaded aperture therethrough, said cylindrical member having a smooth surface and re-entrant concavity in the outer wall thereof, and an outer casing being softer than said cylindrical member for mounting in said aperture of said mounting plate, said outer casing having a shoulder to limit the axial movement thereof, a plurality of axial slots to allow expansion, a small ridge on its external wall to insure a snug fit in said aperture of said mounting plate, and a smooth tapered internal wall, said substantially cylindrical member adapted to be forcibly inserted into said outer casing thereby distorting said tapered internal wall of said outer casing and causing it to flow into said axial slots and said re-entrant concavity of said cylindrical member's outer wall, the internal dimension of said outer casing being smaller than the largest external dimension of said cylindrical member.

2. An expansion nut adapted to be secured in an aperture of a mounting plate, comprising a substantially cylindrical, flangeless member having a threaded axial aperture extending therethrough, a smooth concave surface on the exterior of said member, an axially slotted outer sleeve of a softer material than said member, a flange adjacent one end of said sleeve to prevent axial movement thereof with respect to the aperture in the mounting plate, a small intermittent ridge on the external surface of said sleeve adjacent the opposing end of said sleeve to contact the material of said mounting plate confining the aperture therein, a smooth tapered interior surface on said sleeve, the inclination of said tapered interior surface being greater than the slope of the concave surface of said member, whereby said cylindrical member is adapted to be forcibly inserted into said sleeve thereby distorting said tapered internal surface of said sleeve and causing it to deform into the concavity formed on the external surface of said member, the internal dimension of said sleeve being slightly smaller than the largest external dimension of said cylindrical flangeless member.

3. An expansion nut adapted to be secured in an aperture of a mounting plate comprising a substantially cylindrical, flangeless member having a threaded aperture therethrough, said cylindrical member having a concavity extending around the outer peripheral surface thereof, a smooth surface on the external surface of said member, an outer casing of material softer than said member for mounting in the aperture of said mounting plate, a flange on the outer casing to limit the axial movement thereof, a plurality of axial slots in said casing to allow expansion thereof, a small ridge on the external wall of said casing to insure a snug fit in the aperture of said mounting plate, and a smooth tapered internal wall on said casing, said taper being of a greater inclination than the inclinations forming the concavity on said member, said cylindrical member adapted to be forcibly inserted into said outer casing thereby distorting said tapered internal wall of said casing and causing it to deform into said concavity of said member, the internal dimension of said casing being slightly smaller than the largest external dimension of said cylindrical flangeless member.

References Cited in the file of this patent

UNITED STATES PATENTS

| | | | |
|---|---|---|---|
| 694,769 | Medbury | Mar. 4, | 1902 |
| 996,133 | Peters | June 27, | 1911 |
| 1,038,834 | Bloom | Sept. 17, | 1912 |
| 1,207,413 | Kennedy | Dec. 5, | 1916 |
| 1,816,970 | Hess | Aug. 4, | 1931 |
| 1,842,117 | Renshaw | Jan. 19, | 1932 |
| 2,345,910 | Fawcett | Apr. 4, | 1944 |
| 2,402,583 | Schumacher | June 25, | 1946 |
| 2,544,304 | Eckenbeck et al. | Mar. 6, | 1951 |

FOREIGN PATENTS

| | | | |
|---|---|---|---|
| 682,562 | Great Britain | Nov. 12, | 1952 |